(12) United States Patent
Hickerson

(10) Patent No.: US 7,677,241 B2
(45) Date of Patent: Mar. 16, 2010

(54) APPARATUS FOR REDIRECTING PARALLEL RAYS USING RIGID TRANSLATION

(75) Inventor: Kevin P. Hickerson, Altadena, CA (US)

(73) Assignee: Energy Innovations, Inc., Pasadena, CA (US)

(*) Notice: Subject to any disclaimer, the term of this patent is extended or adjusted under 35 U.S.C. 154(b) by 847 days.

(21) Appl. No.: 11/058,023

(22) Filed: Feb. 14, 2005

(65) Prior Publication Data

US 2006/0060188 A1 Mar. 23, 2006

Related U.S. Application Data

(60) Provisional application No. 60/612,592, filed on Sep. 22, 2004.

(51) Int. Cl.
*F24J 2/38* (2006.01)
*F24J 2/46* (2006.01)

(52) U.S. Cl. .................. 126/600; 126/571; 126/605; 250/203.4

(58) Field of Classification Search .............. 126/600, 126/680, 576, 577, 571, 605, 606; 353/3; 250/203.4
See application file for complete search history.

(56) References Cited

U.S. PATENT DOCUMENTS 1,973,185 A * 9/1934 Trbojevich .................. 74/462
3,466,119 A * 9/1969 Francia ....................... 359/851
4,056,313 A 11/1977 Arbogast
4,102,326 A 7/1978 Sommer
4,110,010 A 8/1978 Hilton
4,218,114 A * 8/1980 Bunch ........................ 359/853
4,295,462 A * 10/1981 Bunch ........................ 126/605
4,317,031 A 2/1982 Findell
4,401,103 A 8/1983 Thompson
5,325,844 A * 7/1994 Rogers et al. ............... 126/605
5,632,823 A * 5/1997 Sharan ....................... 136/246
6,766,166 B1 * 7/2004 Draim ......................... 455/430
6,820,611 B2 11/2004 Kinoshita
7,000,608 B2 2/2006 Loschmann

* cited by examiner

*Primary Examiner*—Kenneth B Rinehart
*Assistant Examiner*—Chuka C Ndubizu
(74) *Attorney, Agent, or Firm*—Andrew S. Naglestad; Michael Blaine Brooks, PC; Michael B. Brooks

(57) ABSTRACT

An accurate and cost effective heliostat array and method of use is disclosed. The heliostat array in the preferred embodiment comprises a plurality of mirrors arrayed in a common plane, a plurality of reflector positioning arms, and a rigid positioning plate. The positioning plate, which is coupled to each of the reflectors via a positioning arm, is adapted to simultaneously aim each reflector using as few as one or two actuators. When the positioning arms forms the base of an isosceles triangle with one leg aligned with a ray directed to the sun and the other equal length leg aligned with a ray directed to the receiver, the positioning plate has the shape of a Conchoid of Nicomedes surface of revolution, which enables the heliostat array to simultaneously orient all of the mirrors to precisely focus incident sunlight from anywhere in the celestial hemisphere onto a common focal point.

25 Claims, 10 Drawing Sheets

APPARATUS FOR REDIRECTING PARALLEL RAYS USING RIGID TRANSLATION

CROSS-REFERENCE TO RELATED APPLICATION

This application claims the benefit of U.S. Provisional Patent Application Ser. No. 60/612,592 filed Sep. 22, 2004, entitled "APPARATUS FOR REDIRECTING PARALLEL RAYS USING SIMPLE RIGID TRANSLATION," which is hereby incorporated by reference herein for all purposes.

FIELD OF INVENTION

The invention generally relates to mechanically linking and steering a plurality of reflectors of an array such as a solar collector. In particular, the invention relates to a system and method for employing a rigid surface to simultaneously aim a plurality of reflectors in order to map between focused rays associated with a focus and parallel rays having a dynamic incident angle.

BACKGROUND

In prior art linked heliostats including an array of reflectors, the linkages used to aim the plurality of reflectors merely approximate the ideal motion needed to focus parallel rays from the sun to a common focus or were partially or completely independently driven by a plurality of actuators. There is therefore a need for a heliostat array linkage capable of dynamically orienting the plurality of reflectors and precisely focusing the incident sunlight on a single focus using a simple, rigid mechanical coupling device actuated by as few as one or two actuators.

SUMMARY

The invention in the preferred embodiment features an array adapted to simply and mechanically map radiation between a radiation source and a radiation receiver. The array preferably comprises a plurality of reflectors, a positioning plate, and a plurality of reflector positioning arms. The positioning plate, which is coupled to each of the plurality of reflectors via the positioning arms, is adapted to simultaneously aim each of plurality of reflectors so that each reflector faces a direction bisecting the interior angle created by the source, each particular reflector, and the receiver. Each of the reflectors is adapted to rotate about a first center of rotation using a positioning arm to aim the associated mirror while each positioning arm is adapted to rotate relative to the positioning plate about a second center of rotation. If the distance between the first center of rotation and the second center of rotation for each of the plurality of positioning arms is substantially equal to a magnitude of a vector sum of a first unit vector directed to the source and a second unit vector directed to the receiver, the actuated movement of the positing plate can precisely aim each of the reflectors to reflect incoming radiation originating from a distance source to the same focal point or to reflect radiation from a source at the focal point to a distant target.

In the preferred embodiment, the positioning plate is a rigid positioning plate adapted to rotate or swing relative to the reflectors using at least one linkage indirectly coupling the positioning plate to the plurality of reflectors. The linkage may comprise one or more swing arms rotatably coupling the positioning plate to the plurality of reflectors via a chassis, for example, without changing the orientation of the positioning plate. The effective length of the swing arms, as measured between centers of rotation, should be substantially equal to the magnitude of the first and second unit vectors used to define the optimum coupling distance between each reflector and the positioning plate.

If the mirrors are arrayed in a common plane and shared a common focus, for example, the shape of the positioning plate is characterized by a surface of revolution generated by revolving the Conchoid of Nicomedes about an axis intersecting the focal point. A Conchoid of Nicomedes surface of revolution serves to effectively encode the mirror orientation information for each of the plurality of mirrors for all angles of incoming rays over an entire semi-hemisphere. The positioning plate, therefore, provides a simple, mechanical linkage capable of simultaneously aiming each of the plurality or mirrors and precisely focusing incident radiation on a common focal point over a broad solid angle. Where the array is a heliostat array comprising a plurality of mirrors, for example, the positioning plate is capable of accurately focusing sunlight from any number of mirrors over the course of an entire day or year with minimal mechanical sophistication.

In some embodiments, the mirrors or other reflectors are made to coincide with a first Conchoid of Nicomedes surface of revolution while the positioning plate, as defined by the set of second centers of rotation, coincide with a second Conchoid of Nicomedes surface of revolution, wherein neither the first surface or second surface is planar. In this embodiment.

The invention in some embodiments pertains to a method of using an array of reflectors to map between focused rays associated with a focus and parallel rays associated with a distant moving object. The method preferably comprises the steps of determining a first unit vector pointing between each of the plurality of reflectors and the focus for each of the plurality of reflectors; determining a second unit vector pointing between the array and the object; and connecting each of the plurality of reflectors to a positioning plate with a positioning arm, wherein the length of the positioning arm between the positioning plate and associated reflector is substantially equal to a magnitude of a vector sum of a first vector in the direction of the focus and a second vector in the direction of the object. Displacement of the positioning plate using as few as one or two actuators may then be used to simultaneously orient each of the plurality of reflectors between the focus and object.

DESCRIPTION OF THE PREFERRED EMBODIMENT

Figure 1:
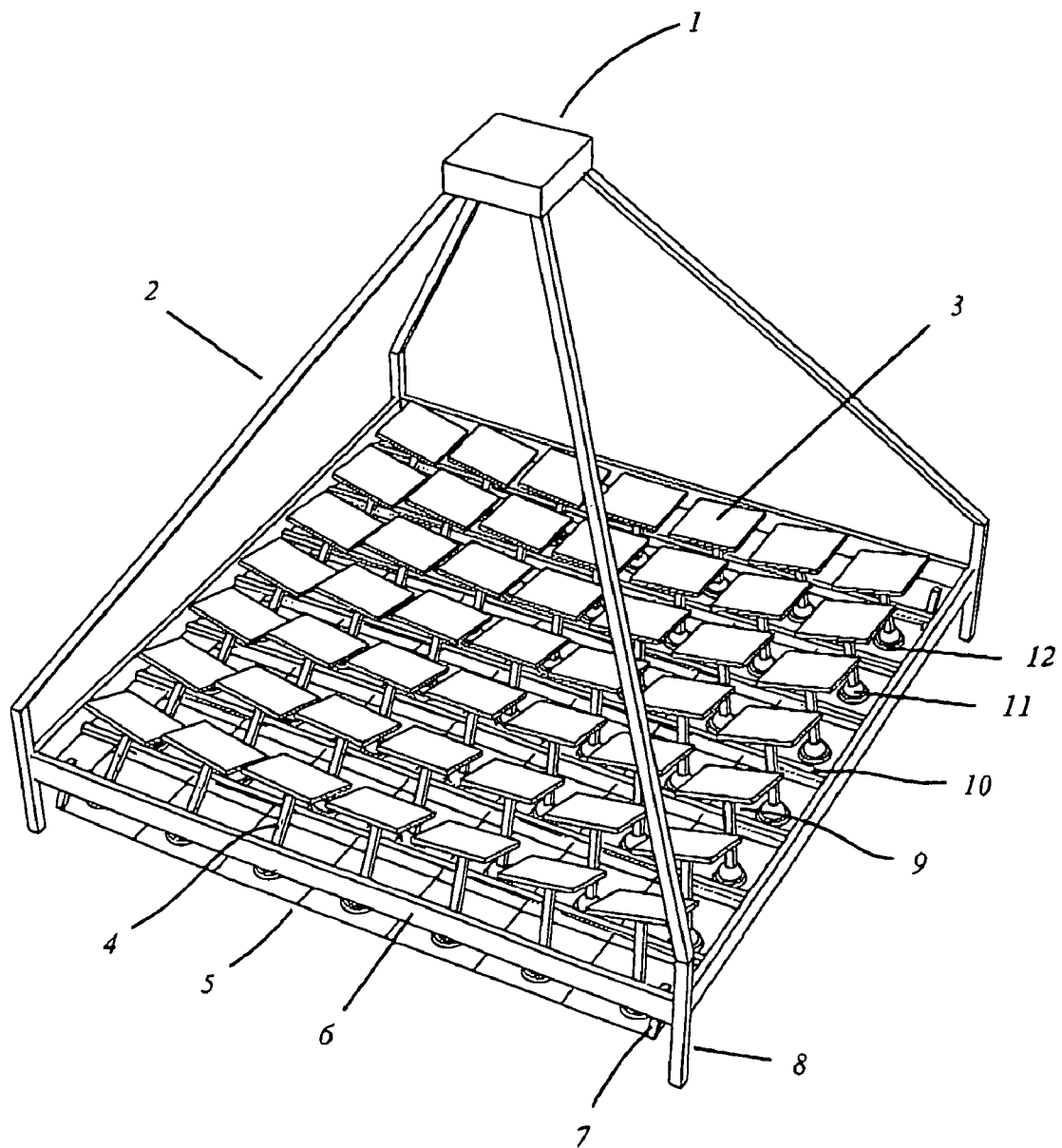
FIG. 1 is a perspective illustration of a heliostat that uses parallel motion of a rigid plate to position the mirrors simultaneously using simple parallel translation, in accordance with the preferred embodiment.

Illustrated in FIG. 1 is a heliostat array which, in its several embodiments, provides bi-directionality of rays of directional rays and in so doing provides a mapping from parallel rays to focused rays or a mapping from focused rays to parallel rays. The heliostat array comprises a plurality of reflectors and a positioning plate for simultaneously orienting the plurality of reflectors. The positioning plate is adapted to aim or otherwise orient each of the plurality of reflectors in a direction bisecting the interior angle between the source of the radiation and the receiver of the reflected radiation, thereby mapping between the parallel rays associated with a distant object and focused rays associated with the focus. In accordance with the preferred embodiment of the present invention, the positioning plate is a rigid plate with a contoured surface adapted to simultaneously orient each of the plurality of reflections while changing the direction of the parallel rays, i.e., their angles of incident, where the distant object is moving, for example. One skilled in the art will appreciate that the preferred embodiment of the present invention may be used to transmit radiation from a source to a distant object or to collect radiation from a distant object then direct to a common focal point. One skilled in the art will appreciate that the array may be adapted to reflect radiation from a wide portion of the electromagnetic spectrum.

In the preferred embodiment, the array is a linked heliostat array comprising a plurality of siderostats, a positioning plate operatively coupled to each of the plurality of siderostats, and a receiver incorporated into the receiver housing 1. The plurality of siderostats in cooperation with the positioning plate 5, are adapted to reflect the incident sunlight to a common focal point coinciding with a receiver (not shown) independently of the position of the sun. Each of the plurality of siderostats includes a combination reflector and a positioning arm rotatably attached to a heliostat chassis by means of an articulated mounting structure permitting the reflector to be steered under the control of the actuated positioning plate. The positioning plate 5 is generally characterized by a nonplanar surface configured to orient each of the reflectors to reflect the sunlight to the same fixed focal point as the sun sweeps across the diurnal sky, for example. The positioning plate 5 is effectively geometrically encoded with the position of each reflector as a function of the receiver position and position of the reflector within the array.

In the preferred embodiment, the reflectors are mirrors 3 that reflect incident sunlight to the receiver housing 1 and the receiver therein. The position of the receiver and housing 1 are preferably fixed relative to the plurality of siderostats by means of receiver support arms 2. The receiver in the preferred embodiment includes a photovoltaic plate, associated electronics, and cooling system, although various other forms of energy converters may also be employed including thermal absorbing liquids, for example. In alternative embodiments, the receiver is selected from a group comprising a heat exchanger, heat engine, and turbine, for example.

The plurality of mirrors in the preferred embodiment are arrayed two dimensionally in a horizontal or incline plane and the mirrors adapted to rotated about two orthogonal axes. In other embodiments, the plurality of mirrors may be arrayed three dimensionally with suitable modification to the contour of the positioning plate 5. In the preferred embodiment, each of the siderostats is rotatably affixed to heliostat chassis which comprises a support frame 6, a plurality of supports 10 spanning the width of the chassis, and a plurality of stantions 9 atop the supports 10 for mounting the mirrors 3.

In the preferred embodiment, each of the mirrors 3 has a mirror positioning arm 4 rigidly affixed to the back surface of the mirror 3. Each mirror positioning arm 4 is oriented perpendicularly to the associated mirror 3 at the point of contact at the center of the back surface. Each combination of mirror 3 and positioning arm 4 is rotatably coupled to the chassis by means of a primary articulated joint positioned at the proximal end of the positioning arm 4 in proximity to the point of attachment to the backside of the mirror 3. The distal end of the positioning arm 4, in turn, is rotatably coupled to the positioning plate 5 by means of a secondary articulated joint, preferably a ball joint or universal joint, that permits the positioning arm 4 to rotate as the positioning plate 5 is displaced via a rotational or translational motion. The secondary articulated joint may also permit the positioning arm 4 to slide in the direction of its longest axis, thereby enabling the positioning plate 5 to move closer to or further away from the associated mirror 3 as the positioning plate is displaced to account for movement of the sun.

Figure 2:
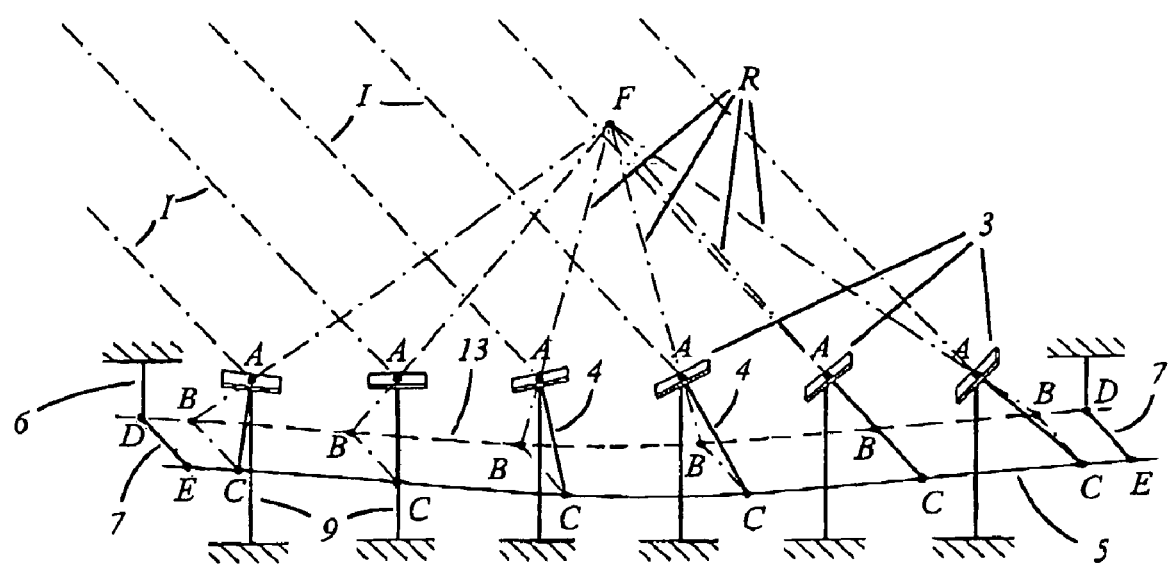
FIG. 2 is a schematic illustration of the heliostat, in accordance with the preferred embodiment.

Illustrated in FIG. 2 is a schematic view of the heliostat array including the receiver and a co-planar array of siderostats. As can be seen, the plurality of mirrors 3 is oriented so as to reflect the parallel incoming rays, I, and direct all reflected rays, R, to a common focal point, F, coinciding with the receiver. The orientation of the mirrors 3 is controlled by the positioning plate 5 via the positioning arms 4. The positioning arms 4 are schematically represented by the resultant line segments, AC, where each point A schematically represents the center of rotation of a mirror 3 and its associated positioning arms 4 relative to heliostat chassis. Each point C schematically represents the center of rotation of each positioning arm 4 relative to the positioning plate 5.

Each of the mirrors 3 rotates about its center of rotation at point A in response to the displacement of the positioning plate 5 which exerts a torque on the distal end of each positioning arms 4. In the preferred embodiment, the positioning plate 5 is mounted to the chassis by means of one or more linkages including swing arms 7. Each of the swing arms is rotatably attached to the chassis 6 means of first hinge D and rotatably attached to the positioning plate 5 by means of a second hinge E. The first hinges D and second hinges E are preferably ball joints or universal joints allowing the positioning plate 5 to swing about two orthogonal axes.

In accordance with the teachings of the preferred embodiment, the distance between the positioning plate 5 and each mirror 3 in a direction normal to the mirror is schematically illustrated by line segment AC. The length of the segment AC is selected to be the magnitude of a resultant vector equal to the sum of two vectors, wherein the first vector and the second vector have the same magnitude. The first unit vector of the two vectors, coinciding with a ray schematically represented by the segment AB, points from an individual mirror 3 to the focal point F coinciding with the receiver. The point A therefore lies on the line segment FB, such that the segment AB is parallel to the reflected rays R. The second vector of the two component vectors points to the radiation source and is schematically represented by the segment BC. The length of the two component vectors are equal and thus form an isosceles triangle ABC with the sum vector spanning segment AB as the base.

The line segments BC are substantially parallel to one another for a distant radiation source. When the length of the swing arms 7 is made equal to the magnitude of the first and second vectors, each of the positioning arms 4 is adapted to coincide with the base of an isosceles triangle ABC for each siderostat for any orientation of the position plate 5.

Thus, when the swing arms 7 are oriented parallel to the incident rays, each of the positioning rods 4—as defined by the distance between the first center of rotation A and the second center of rotation C—is oriented in a direction that bisects the interior angle between a source vector pointing to the sun and a receiver vector pointing from the associated mirror 3 to the focal point F.

If the plurality of mirrors 3 are co-planar, and all mirrors 3 share a common focal point F, the contour of the positioning plate 5 adapted to intersect each of the secondary centers of rotation, i.e., the points about which the positioning arms 4 rotate about the positioning plate 5, is given by the Conchoid of Nicomedes. For a two-dimensional array of mirrors 3, the shape of the positioning plate 5 is given by the Conchoid of Nicomedes surface of revolution represented in parametric form by:

$$\vec{x} = \left\{ u\left(1 + \frac{d}{r}\right), v\left(1 + \frac{d}{r}\right), -\frac{h}{r} \right\} \quad [1]$$

where u, v, are the position variables in a Cartesian coordinate system and $$r = \sqrt{u^2 + v^2 + h^2}. \quad [2]$$

The variable h is the perpendicular distance of the focal point at point F from the plane that contains all the centers of rotation at represented by points A. The variable d is the length of the swing arm 7 which is substantially equal to the length of the segment AB. The axis about which the Conchoid of Nicomedes is revolved intersects the focal point F and is perpendicular to the plane defined by the primary centers of rotation, i.e., each point A.

One skilled in the art will appreciate that the positioning plate 5 having the shape of the Conchoid of Nicomedes surface of revolution permits the positioning plate to simultaneously point each of the mirrors such that the reflected rays R for each mirror 3 is directed to the same focus for any position of the sun. Moreover, all of the mirrors 3 may be simultaneously re-oriented to track the movement of the sun by simply swinging or otherwise rotating the positioning plate 5 such that the swing arms 7 are parallel with the incident rays I.

Figure 3:
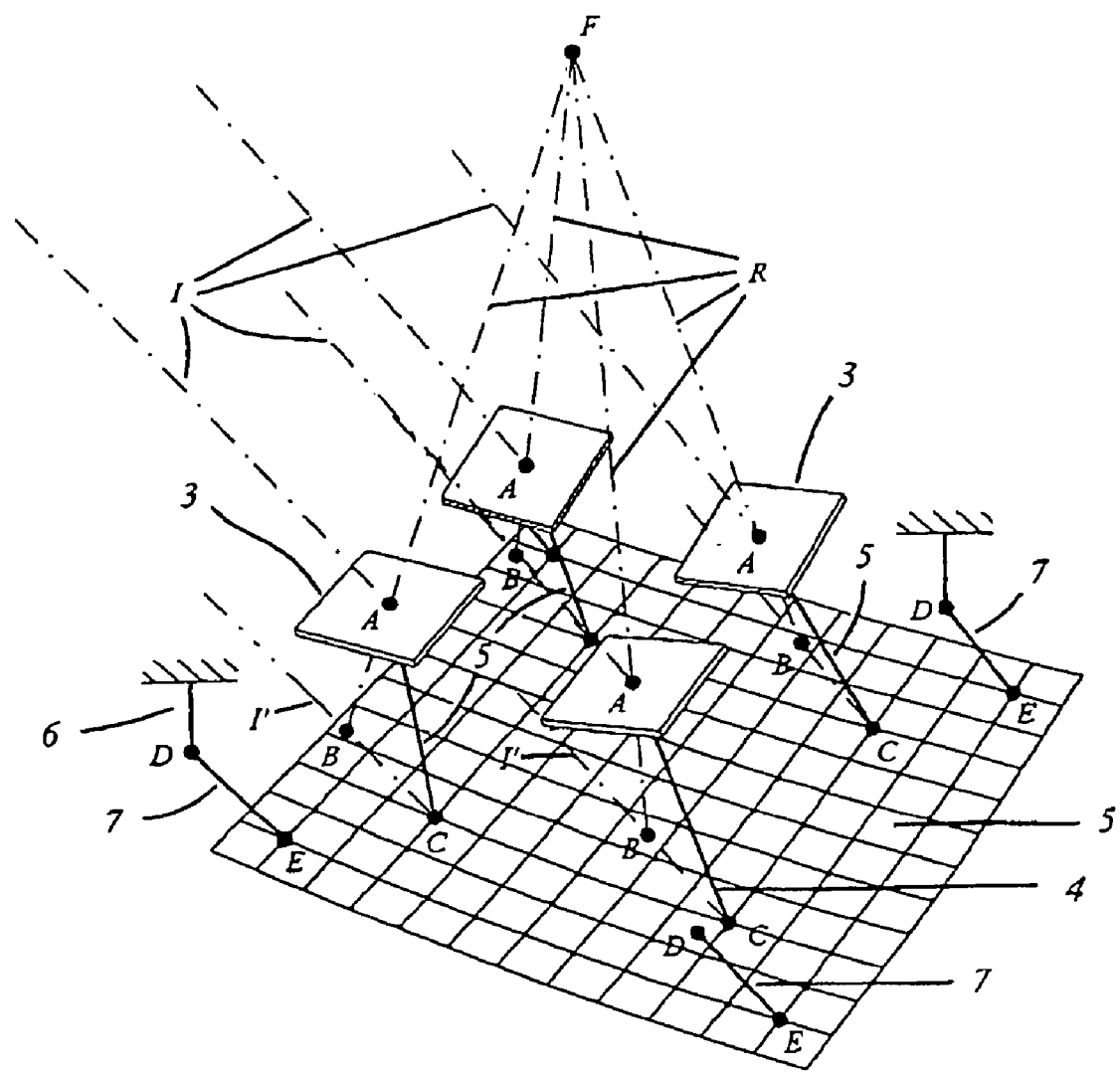
FIG. 3 is schematic perspective view of the heliostat, in accordance with the preferred embodiment.

Illustrated in FIG. 3 is an schematic perspective view of the heliostat array including a co-planar array of four siderostats adapted to reflect radiation between a distance source of incident radiation I and a receiver (not shown) at the focal point F. As in FIG. 2, each of the plurality of mirrors 3 is adapted to rotate about the primary center of rotation at point A in accordance with the movement of the positioning plate 5. The distance between each mirror 3 and the point of attachment of the associated positioning arm to the positioning plate is given by the vector sum of two component vectors, each of the vectors having a magnitude equal to the length of the swing arm 7 between its points of rotation schematically represent by points D and E. The first of the two component vectors coinciding with segment AB indicates the direction of the focal point relative to the mirror while the second component vector coinciding with segment BC indicates the direction of the source.

Figure 4:
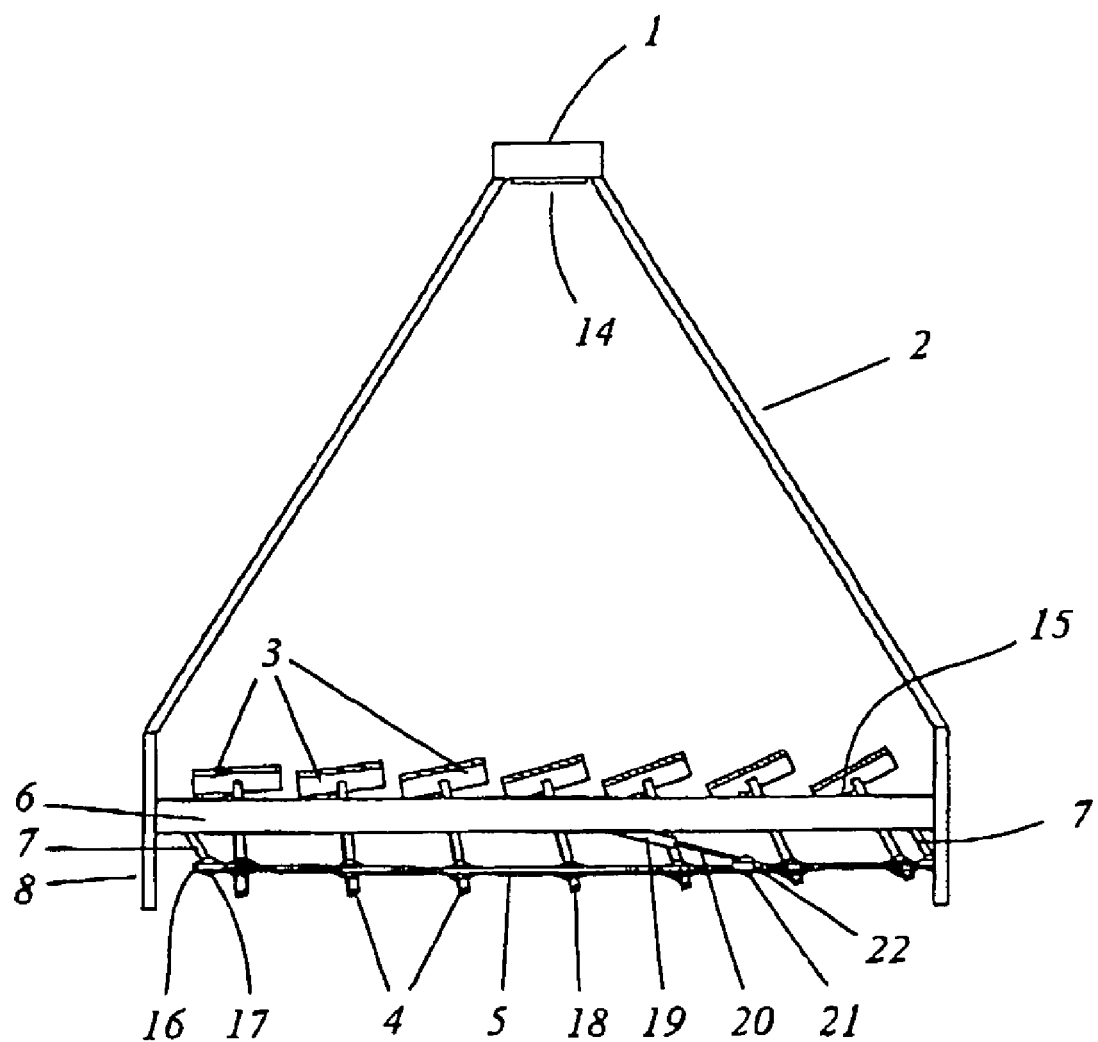
FIG. 4 is a side view of the heliostat, in accordance with the preferred embodiment.

Illustrated in FIG. 4 is a side view of an exemplary heliostat array. Each of the plurality of mirrors is oriented so as to bisect the interior angle between an incident ray I and reflected ray R directed to receiver 14. To account for diurnal movement of the source as well as seasonal changes in the declination of the sun, preferably the heliostat is adapted to continuously or continually track movement of the source and alter the position of the positioning plate 5 accordingly. The positioning plate 5 is positioned using at least one, preferably two, actuators that drive the positioning plate 5 to swing relative to the chassis about one, preferably two, orthogonal axes. Each of the one or more actuators (not shown), which may include a servo or stepper motor, for example, are operably coupled to the positioning plate 5 by means of a frame actuator arm 19, a positioning plate actuator arm 20, and an articulated joint including joint ball 21 and ball socket 22.

Figure 5A:
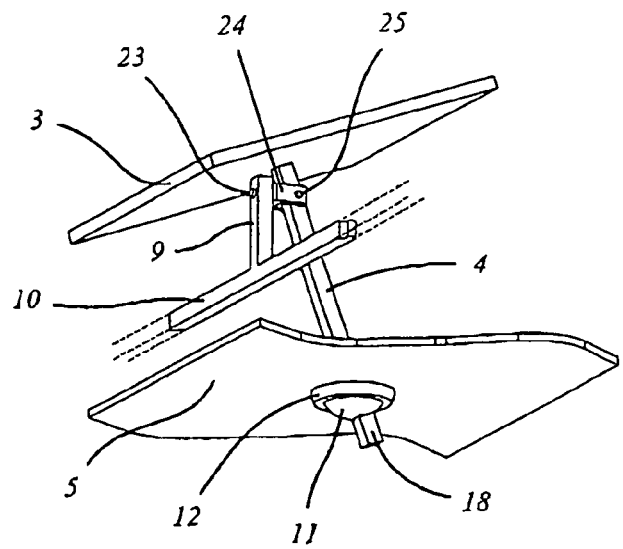
FIG. 5A is a diagrammatical illustration of a siderostats from the underside of the positioning plate, in accordance with the preferred embodiment.
Figure 5B:
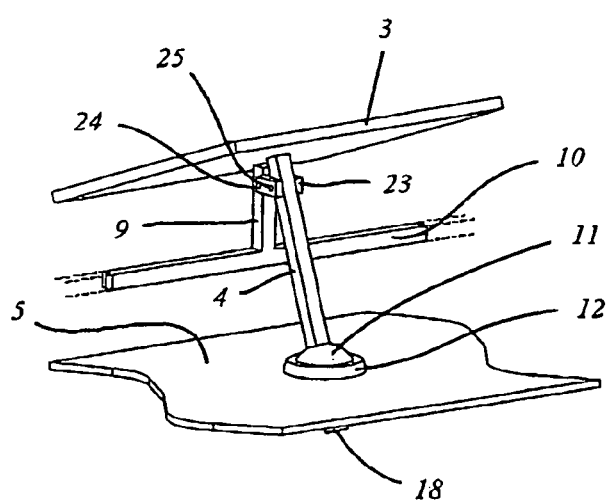
FIG. 5B is a diagrammatical illustration of a siderostats from the topside of the positioning plate, in accordance with the preferred embodiment.

Illustrated in FIGS. 5A and 5B is an individual siderostat operably coupled to the heliostat chassis and positioning plate 5. The siderostat is operably coupled to the chassis, namely the stantion 9, using a primary articulated joint that permits compound rotation about two orthogonal axes that intersect at the primary center of rotation, which was schematically illustrated by point A in FIGS. 2 and 3. The primary articulated joint in the preferred embodiment is a universal joint although a ball joint may also be employed. An articulated joint may include a yolk 24 that permits the mirror 3 and integral position arm 4 to rotate up and down about the yoke pin 25 and rotate about the spindle 23.

The siderostat is also operably coupled to the positioning plate 5 using a secondary articulated joint, preferably a ball joint, for example, including a joint ball 11 and ball socket 12. Due to the fact that distances between each mirror 3 and the positioning plate 5 generally vary as the orientation of the mirrors is changed, the joint ball 11 is adapted to slidably engage the positioning arm 4, thereby allowing the positioning plate 5 to swing up towards or down away from the mirror 3. For example, the ball joint 11 of the secondary articulated joint may include a bore adapted to receive the distal end 18 of the positioning rod 4.

Although the effective length of the positioning arm 4 represented by the segment AC may be varied by slidably engaging the positioning plate 5, the distal end of the positioning arm 4 in other embodiments may be fixedly and rotatably attached to the positioning plate 5 using a positioning arm made of a concentric slidable sleeve and cylinder having an overall length adapted to be adjusted telescopically. In some other embodiments, one end of the positioning arm 4, the end in proximity to the mirror 3, may be adapted to slide through the primary articulated joint at point A while the opposite end is fixedly attached to the positioning plate 5 at the second articulated joint coinciding with point C.

Figure 6:
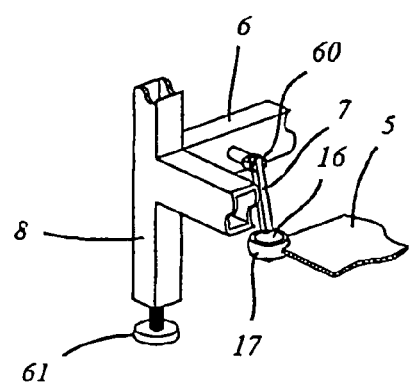
FIG. 6 is a diagrammatical illustration of the linkage coupling the positioning plate to the heliostat chassis, in accordance with the preferred embodiment.

Illustrated in FIG. 6 is a linkage coupling the positioning plate 5 to the heliostat chassis 6. The linkage in the preferred embodiment includes a swing arm 7 with articulated joints on either end. The articulated joint between the swing arm 7 and the heliostat chassis includes a universal joint 60 while the articulated joint coupled to the positioning plate 5 includes ball joint having a ball 16 and a socket 17. In accordance with the preferred embodiment, the linkage causes the position plate 5 to maintain a substantially horizontal orientation while confining the movement of the plate to trace the surface of a sphere around point D. In the preferred embodiment, the frame is supported by adjustable leveling feet 61 through an adjustment screw 62.

Figure 7:
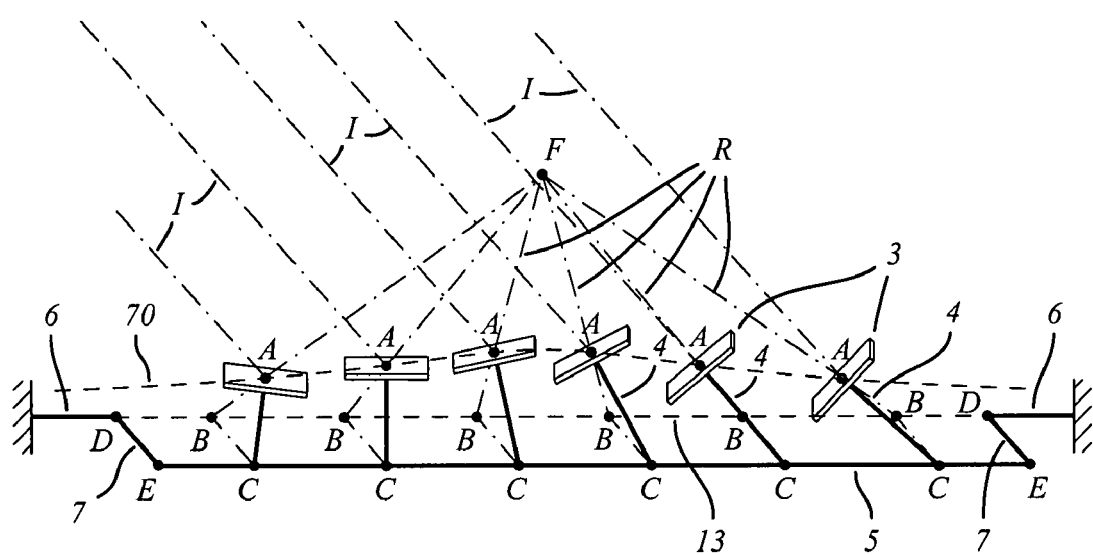
FIG. 7 is a schematic illustration of the heliostat, in accordance with one embodiment.

Illustrated in FIG. 7 is a schematic view of another embodiment of the heliostat array in which the locations of the centers of rotation of the mirror positioning arms 4 relative to the positioning plate 5, schematically represented by points C, all lie in a common plane. The center of rotation of each mirror 3, schematically represented by points A, is interposed between the focal point and the positioning plate 5 at a distance given by the vectoral sum of a first vector and a second vector, each having the same magnitude. The first vector points from a point B to the mirror's center of rotation while the second vector points from center of rotation of the positioning arm 4 at the positioning plate 5 to an associated point B. In this embodiment, locus of all points B also form plane. For every such point C, points A lie on a surface formed by the Conchoid of Nicomedes surface of revolution. As one of ordinary skill will appreciate, since the centers of rotation of the mirrors 3 lie on the Conchoid of Nicomedes surface of revolution, so do the points B and points C, the particular Conchoid of Nicomedes surfaces of revolution being simple planes. The positioning plate 5 in this embodiment may be a rigid frame or a wire mesh in which the wires are held in tension around the periphery of the heliostat array.

Figure 8:
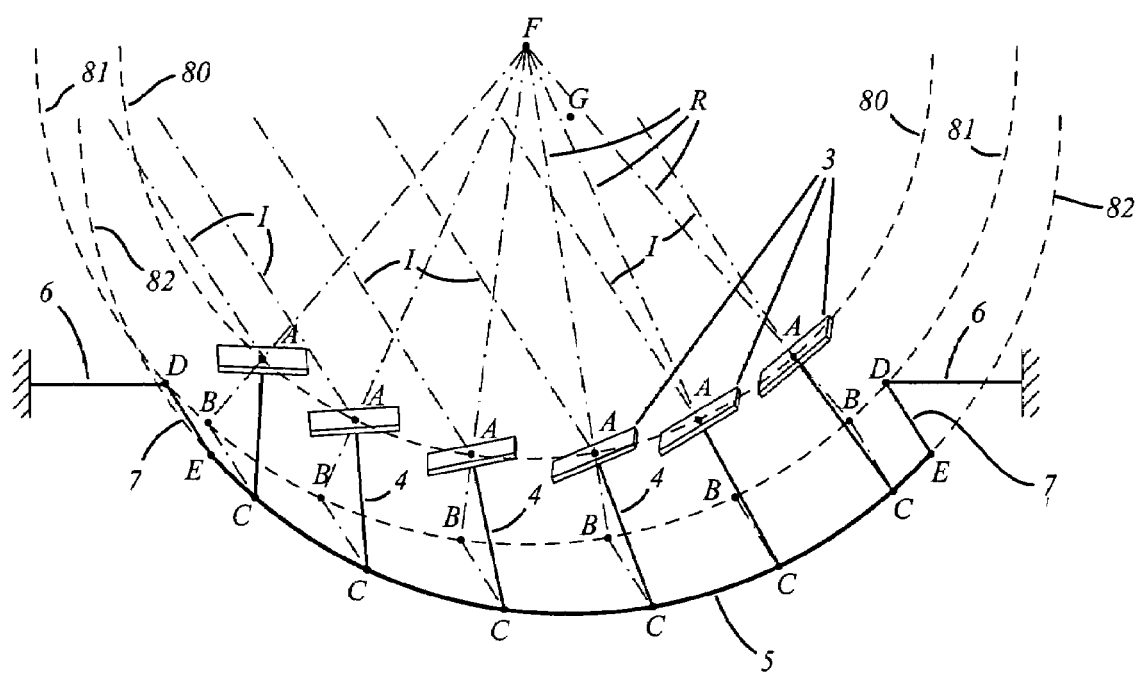
FIG. 8 is a schematic illustration of the heliostat, in accordance with one embodiment.

Illustrated in FIG. 8 is a schematic view of another exemplary embodiment of the heliostat array wherein the location of points A, i.e., the centers of rotation of each mirror 3, are distributed in the form of a sphere centered at the focal point, F, with a radius equal to the length of the segments AF, schematically represented by the surface 80. The corresponding positioning plate 5 includes the points C as well as points E. Each of the points C schematically represents one of the centers of rotation of the positioning arms 4 while points E schematically represent a pair of second hinges operatively coupling the positioning plate 5 to a pair of swing arms 7. As discussed above, the center of rotation of each mirror 3 is interposed between the focal point and the positioning plate 5 at a distance given by the vectoral sum of a first vector and a second vector having the same magnitude. As discussed above, the first vector points from a point B to the mirror's center of rotation while the second vector points from center of rotation of the positioning arm 4 at the positioning plate to an associated point B.

In this embodiment, the points B all lie on the sphere centered at F, with a radius equal to the length of the segments BF, schematically represented by the spherical surface 81. Sphere 81 is concentric with sphere 80. Because A, B and F are collinear with A lying on the segment BF, the radius of 81 is equal to the sum of the lengths of segments AB and AF. In this embodiment, the mirror positioning plate 5 is shaped such that the points C lie on a sphere having a center at point G and a radius equal to the length of the segments CG, the sphere being schematically represented by the surface 82. As the positioning plate 5 is displaced in accordance with the swing arms 7, the point G is confined to rotate about the focal point in a sphere having a radius given by the length of the segment FG which is equal in magnitude to the segments AB, BC, and DE. The segment FG is substantially parallel to rays I and to the segments BC and DE.

As one skilled in the art will appreciate, the sphere 81 is equal in radius to sphere 82. As above, plate 5 is rotatably coupled to points E by links 7 which are rotatably coupled to points D which are fixed relative to points A and F. One skilled in the art will appreciate that points D and E need not lie on surface 81 and surface 82 and may be displace by parallel translation as long as point E is rigidly and mechanically coupled to plate 5.

Figure 9:
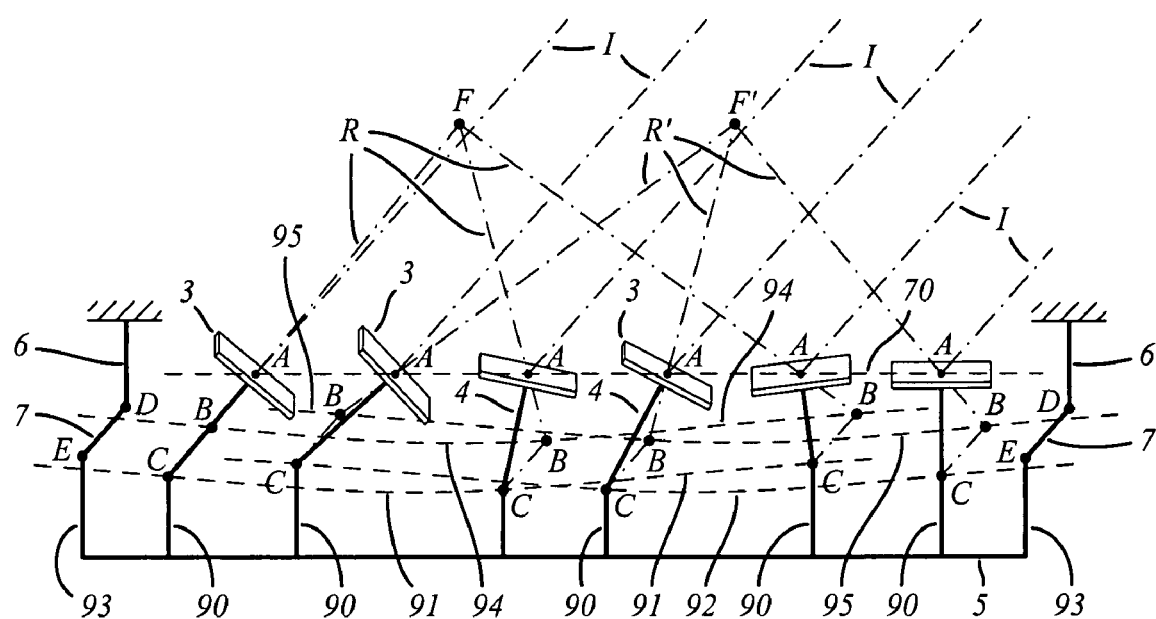
FIG. 9 is a schematic illustration of the heliostat, in accordance with one embodiment.

Illustrated in FIG. 9 is a schematic view of another exemplary embodiment of the heliostat array in which the plurality of mirrors 3 has a different focal point F. In this embodiment, the plurality of focal points include a first focal point and a second focal point indicated by points F and F', respectively. The rays I incident on a first set of one or more of the mirrors 3, for example, are directed as rays R to point F while rays I incident on a second set of one or more of the mirrors 3 are directed as rays R' to point F'. In the exemplary embodiment illustrated in FIG. 9, individual mirrors focus to point F and the mirrors focused to point F' are interleaved, yet are still operatively coupled to the same positioning plate 5 via rigid connections 90 that project at a right angle to the plate 5 in this embodiment. The position plate 5 is adapted to incorporate the centers of rotation C about which the distal end of each of the positioning arms 4 rotate using the rigid connection 90. The locus of points C, such that the corresponding mirror 3 attached to C through arms 4 direct rays at F, is schematically represented by the surface 91. Similarly, the locus of points C, such that the corresponding mirror 3 attached to C through arms 4 direct rays at F', is schematically represented by the surface 92. The special case that the points A share a common locus 70, for each point F and F' there is a corresponding locus of points B schematically represented here as 94 and 95 respectively.

In the special case that the locus of points 70 forms a plane, the shape of a first surface including surface 91 and surface 94 forms a Conchoid of Nicomedes surface of revolution having an axis of rotation including the point F that is perpendicular to 70. Similarly, a second surface including surfaces 92 and 95 forms a Conchoid of Nicomedes surface of revolution having an axis of rotation including the point F' that is perpendicular to 70.

One of ordinary skill in the art will appreciate that using this embodiment as an example, each point A coinciding with the centers of rotation of the mirrors may have a distinct point F which is programmed or encoded into the positioning plate 5 by adjusting the position of point C relative to an associated point A in the manner described above. In other embodiments, the plurality of mirrors may be used to redirect light in multiple directions toward points $F_i$ for each point $A_i$ where $F_i$ is substantially fixed relative to $F_i$ and where i is an index over the plurality of points $A_i$ with only one rigid positioning plate 5 actuated with as few as one or two actuators.

One of ordinary skill in the art will recognize that multiple foci allow a single unit to possess sets of mirrors that shadow less of incident rays I and therefore more densely packed mirrors. Embodiments similar to this allow for separate units to be linked together using one or two actuators for multiple foci.

Figure 10:
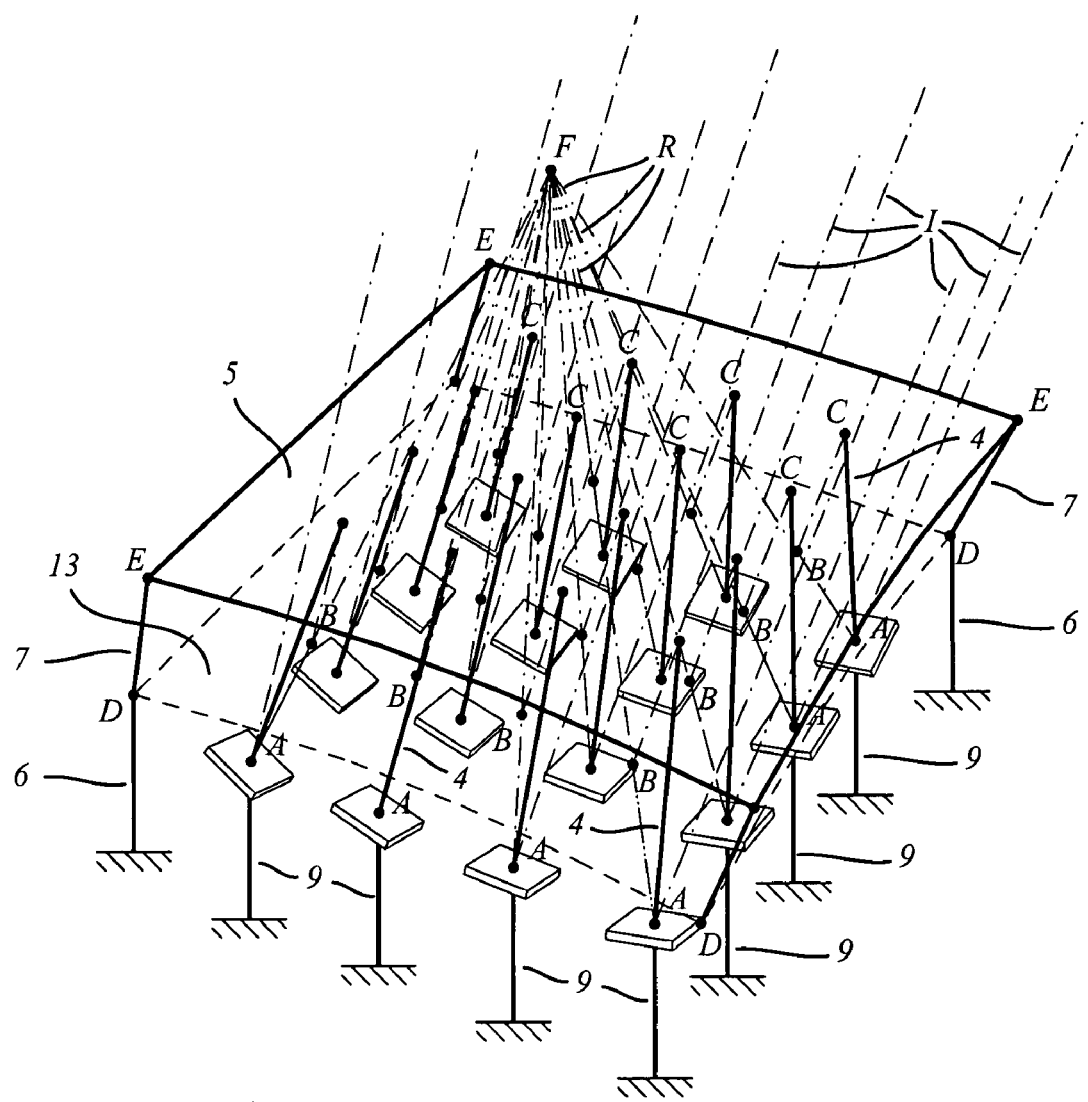
FIG. 10 is a schematic illustration of the heliostat, in accordance with one embodiment.

Illustrated in FIG. 10 is a schematic view of an exemplary embodiment of the heliostat array in which the mirror positioning plate 5 is interposed between the focal point F and the mirror rotation centers A. In this embodiment, the points C—corresponding to the centers of rotation of the distal ends of positioning arms 4—are positioned by plate 5 where they are interposed between points A and the focus F such that points B lie on the line segments AF. In this embodiment, positioning arms 4 that extend perpendicularly from the reflective side of the mirrors 3 rotatably engage the rigid positioning plate 5 above the mirrors about points C. As described above, for the special case that the points A lie on a plane, the points B lie on a Conchoid of Nicomedes surface of revolution. Similarly, if the points B lie on a plane then the points A lie on Conchoid of Nicomedes surface of revolution in each case generated by the focal point F.

The positioning plate 5 in this configuration is adapted to minimize the obstruction of incident energy so as to permit the incident rays I and redirected rays R to pass relatively unimpeded from both the distant radiation source and to the focus F. In the preferred embodiment, the positioning plate 5 is constructed from a rigid and substantially transparent material, formed with holes, or made of a mesh-like material, for example. One of ordinary skill in the art will recognize that this can be achieved with a wire mesh or a grid that can engage 4 such that it passes through point C. The length of segments AC must again be allowed change such that each triangle ABC is isosceles with segment AC as the base. In this embodiment, positioning plate 5 is rotatably coupled to a foundational support 6 by means of rigid swing arms 7 having hinges schematically represented by points E and points D. The hinges at points D are fixedly attached to the foundation 6 relative to points A and point F. As with the preferred embodiment, segments ED are parallel to segments AB, which are in turn parallel to rays I.

Figure 11:
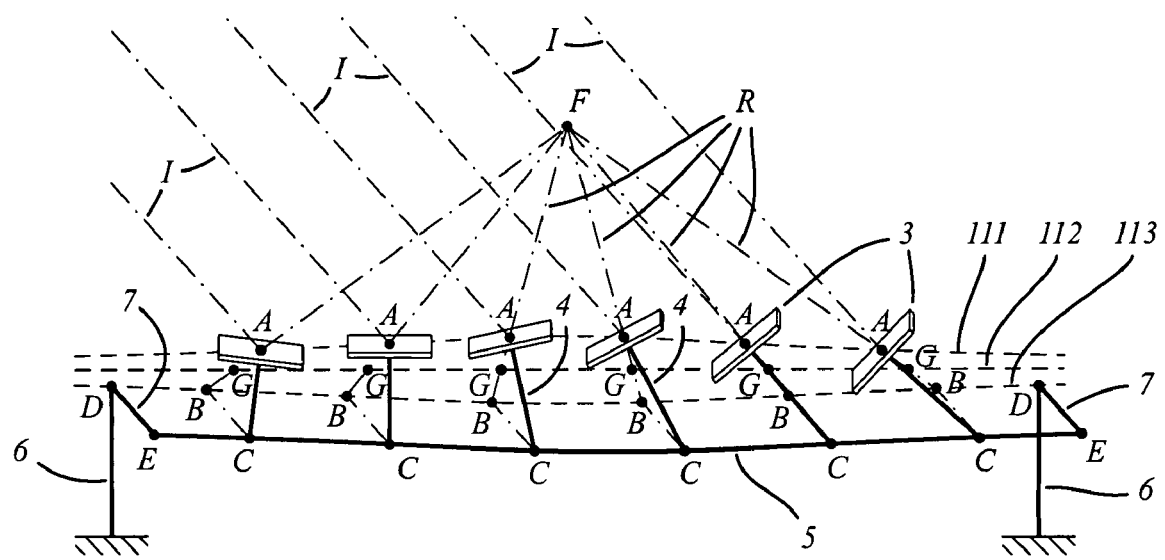
FIG. 11 is a schematic illustration of the heliostat, in accordance with one embodiment.

Illustrated in FIG. 11 is a schematic view of another exemplary embodiment of the heliostat array in which the centers of rotation of the mirror, schematically represented by points A, all lie on a first Conchoid of Nicomedes surface of revolution 111 while the locations of the centers of rotation of the mirror positioning arms 4 relative to the positioning plate 5, schematically represented by points C, all lie on a second Conchoid of Nicomedes surface of revolution. The distance between the center of rotation of each mirror 3 and the positioning plate 5 is given by the vectoral sum of a first vector and a second vector having the same magnitude. The first vector, parallel to line segment AB, points from an associated point B to the mirror's center of rotation in the direction of the focal point F while the second vector, parallel to line segment BC, points from center of rotation of the positioning arm 4 at the positioning plate 5 to an associated point B in the direction of the source of the incident rays I. As described above, the plurality of mirrors may be simultaneously oriented to focus reflected rays R on the focal point F by rotating the positioning plate 5 by swing arms 7 such that the second vector points to the source of incident rays I. The positioning plate 5 in preferably a rigid frame or a wire mesh in which the contour of the wires are maintained by tension across the length and width of the heliostat array. As with the preceding embodiments, the positioning plate 5 may interposed between the focal point F and the plurality of mirrors with suitable modification known by those skilled in the art.

FIG. 11 illustrates by example a further inclusion of a virtual plane 112 coinciding with a plurality of points G. The segments AG associated with the plurality of mirrors 3 are all the same length. Similarly, the segments GB associated with the plurality of mirrors 3 are also the same length. One of ordinary skill in the art will appreciate therefore that length of segments AB is equal to the sum of AG and GB which is equal to the length of segments BC, thereby demonstrating the geometric basis underlying the operation of the heliostat array. Moreover, while the virtual plane 112 is illustrated in a position interposed between the first Conchoid of Nicomedes surface of revolution 111 and the second Conchoid of Nicomedes surface of revolution 5, one skilled in the art will appreciate that the first and second surfaces of revolution 111, 5 may be configured such that the virtual plane 112 may lie between the mirrors 3 and the focal point F or below the positioning plate opposite the focal point F.

Although the first and second embodiments described above include a plurality of mirrors arrayed in a plane, one skilled in the art will appreciate that the mirrors may also be arrayed in three dimensions provided appropriate adjustment is made to the positioning plate. In particular, the position plate is adapted to incorporate the centers of rotation about which the distal end of each of the positioning arms rotates wherein the distant between the center of rotation of each mirror and the distal end of the positioning arm is substantially equal to the vector sum of the receiver unit vector and the source unit vector as described above.

DEFINITION OF LABELED COMPONENTS

1. Receiver housing
2. Receiver support arms
3. Reflectors or mirrors
4. Mirror positioning arms
5. Rigid mirror positioning plate
6. Mirror support frame
7. Positioning plate swing arm
8. Outer frame support feet
9. Mirror stantions
10. Supports
11. Ball joint and slide ball
12. Ball joint socket
13. Virtual mirror positioning plate (Locus of points B)
14. Receiver
15. Mirror universal joint
16. Positioning plate link arm ball joint socket
17. Positioning plate link arm ball joint ball
18. Mirror positioning sticks
19. Frame actuator arm
20. Positioning plate actuator arm
21. Actuator ball joint ball
22. Actuator ball joint socket
23. Spindle
24. Yoke
25. Yoke pin
60. Swing arm universal joint
61. Adjustable leveling foot
70. Locus of points A
80. Sphere of radius AF centered at F
81. Sphere of radius BF centered at F
82. Sphere of radius CG centered at G
90. Rigid connection of the distal end of positioning arm to positioning plate point C
91. Locus of points C that redirect rays R to point F
92. Locus of points C that redirect rays R to point F'
93. Rigid connection or swing arm joining a point E to a mirror 5

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. An array adapted for directing radiation between a radiation source and a radiation receiver, the array comprising:
   a plurality of reflectors, each reflector adapted to rotate about a first center of rotation;
   a positioning plate adapted to simultaneously aim each of the plurality of reflectors in a direction substantially bisecting an interior angle between the source and the receiver;
   and a plurality of reflector positioning arms directly coupling the plurality of reflectors to the positioning plate, wherein each of the positioning arms is adapted to rotate relative to the positioning plate about a second center of rotation;

wherein a line segment between the first center of rotation and the second center of rotation for each of the plurality of positioning arms is substantially equal to a base of an isosceles triangle having a first leg aligned with a first ray from the source and a second leg parallel to a second ray to the receiver, wherein the first leg and second leg are equal length; and wherein the plurality of reflector positioning arms comprises a first reflector positioning arm and a second reflector positioning arm, and wherein the line segment associated with the first reflector positioning arm and the line segment associated with the second reflector positioning arm are not parallel.

2. The array of claim 1, wherein the positioning plate is a rigid positioning plate.

3. The array of claim 1, wherein the array further comprises at least one linkage rotatably coupling the positioning plate to the plurality of reflectors.

4. The array of claim 3, wherein the at least one linkage comprises a swing arm rotatably coupling the positioning plate to the plurality of reflectors, wherein a length of the swing arm is substantially equal to the magnitude of the second leg.

5. The array of claim 1, wherein the plurality of reflectors are interposed between the positioning plate and the receiver.

6. The array of claim 1, wherein the positioning plate is interposed between the plurality of reflectors and the receiver.

7. The array of claim 1, wherein the plurality of reflectors are arrayed linearly, and the second center of rotation for the plurality of reflectors are distributed in accordance substantially with a Conchoid of Nicomedes.

8. The array of claim 1, wherein the plurality of reflectors are arrayed in a common plane, and the second center of rotation for the plurality of positioning arms are distributed in accordance with a Conchoid of Nicomedes surface of revolution.

9. The array of claim 1, wherein the array flutter comprises:
a plurality of first articulated joints enabling each of the plurality of reflectors to rotate about an associated first center of rotation; and
a plurality of second articulated joints enabling each of the plurality of positioning arms to rotate about the second center of rotation.

10. The array of claim 8, wherein each of the plurality of first joints is selected from the group comprising ball joints and universal joints.

11. The array of claim 8, wherein each of the plurality of second joints is selected from the group comprising ball joints and universal joints.

12. The array of claim 8, wherein one or more of the plurality of second joints enables one of the positioning arms to slidably engage the positioning plate.

13. The array of claim 1, wherein each of the plurality of positioning arms is associated with one of the plurality of reflectors, and wherein each of the plurality of positioning arms projects from the associated mirror at a substantially right angle.

14. The array of claim 1, wherein the array is adapted reflect sunlight to a focus coinciding with the receiver while tracking diurnal changes in the sun's position.

15. The array of claim 5, wherein the positioning plate is planar and the plurality of reflectors coincide with a Conchoid of Nicomedes surface of revolution.

16. The array of claim 5, wherein the positioning plate is a Conchoid of Nicomedes surface of revolution and the plurality of reflectors coincide with a plane.

17. The array of claim 5, wherein the plurality of reflectors are arrayed spherically.

18. The array of claim 5, wherein the plurality of reflectors are arrayed spherically and the positioning plate is spherical.

19. The array of claim 1, wherein the plurality of reflectors are arrayed in a first Conchoid of Nicomedes surface of revolution and the second center of rotation for the plurality of positioning arms are distributed in accordance with a second Conchoid of Nicomedes surface of revolution.

20. The array of claim 1, wherein the array further comprises:
a second receiver;
a second plurality of reflectors, wherein each of the second plurality of reflectors is adapted to rotate about a third center of rotation; and
a second plurality of reflector positioning arms for operably coupling the second plurality of reflectors to the positioning plate, wherein each of the second plurality of positioning arms is adapted to rotate relative to the positioning plate about a fourth center of rotation;
wherein said line segment between the third center of rotation and the fourth center of rotation for each of the second plurality of positioning arms is substantially equal to a base of said isosceles triangle having said first leg aligned with said first ray from the source and said second leg parallel to a third ray to the second receiver.

21. An array adapted to collect sunlight, the array comprising:
a receiver;
a plurality of siderostats, each of the plurality of siderostats comprising a mirror, a positioning arm fixedly attached to the associated mirror, and an articulated joint attached to the associated positioning arm; and
a rigid positioning plate directly coupled to the plurality of positioning arms via the plurality of articulated joints; and
a swing arm rotatably coupling the positioning plate to the plurality of siderostats;
wherein the distance between each of the plurality of mirrors and the associated articulated joint is substantially equal to a magnitude of a vector sum of a first vector in the direction of the sun and a second vector in the direction of the receiver wherein the length of the swing arm is substantially equal to magnitude of the first vector and the second vector; and
wherein the plurality of positioning arms comprises a first positioning arm and a second positioning arm, and wherein the second vector associated with the first positioning arm and the second vector associated with the second positioning arm are not parallel.

22. A method of using an array of reflectors to map between focused rays associated with a focus and parallel rays associated with moving object, the method comprising the steps of:
determining, for each of the plurality of reflectors, a first unit vector pointing between each of the plurality of reflectors and the focus;
determining a second unit vector pointing between the array and the object;
connecting each of the plurality of reflectors to a positioning plate with a positioning arm, wherein the length of the positioning arm between the positioning plate and associated reflector is substantially equal to a magnitude of a vector sum of a first vector in the direction of the focus and a second vector in the direction of the object; and displacing the positioning plate to simultaneously orient each of the plurality of reflectors between the focus and object.

23. An array adapted for directing radiation from one or more radiation sources to one or more predetermined directions, the array comprising:

a plurality of reflectors, each reflector adapted to rotate about a first center of rotation, each reflector being associated with one of the sources and one of said one or more predetermined directions;

a positioning plate adapted to simultaneously aim each of the plurality of reflectors in a direction substantially bisecting an interior angle between the associated source and the associated predetermined direction; and a plurality of reflector positioning arms for directly coupling the plurality of reflectors to the positioning plate, wherein each of the positioning arms is adapted to rotate relative to the positioning plate about a second center of rotation;

wherein a line segment between the first center of rotation and the second center of rotation for each of the plurality of positioning arms is substantially equal to a base of an isosceles triangle having a first leg aligned with a first ray from the associated source and a second leg parallel to the associated predetermined direction, wherein the first leg and second leg are equal length; and wherein the plurality of reflector positioning arms comprises a first reflector positioning arm and a second reflector positioning arm, and wherein the line segment associated with the first reflector positioning aria and the line segment associated with the second reflector positioning arm are not parallel.

24. The array of claim 23, wherein the one or more predetermined directions are a plurality of predetermined directions.

25. The array of claim 24, wherein reflector of the plurality of reflectors is associated with a different one of the plurality of predetermined directions.

* * * * *